UNITED STATES PATENT OFFICE.

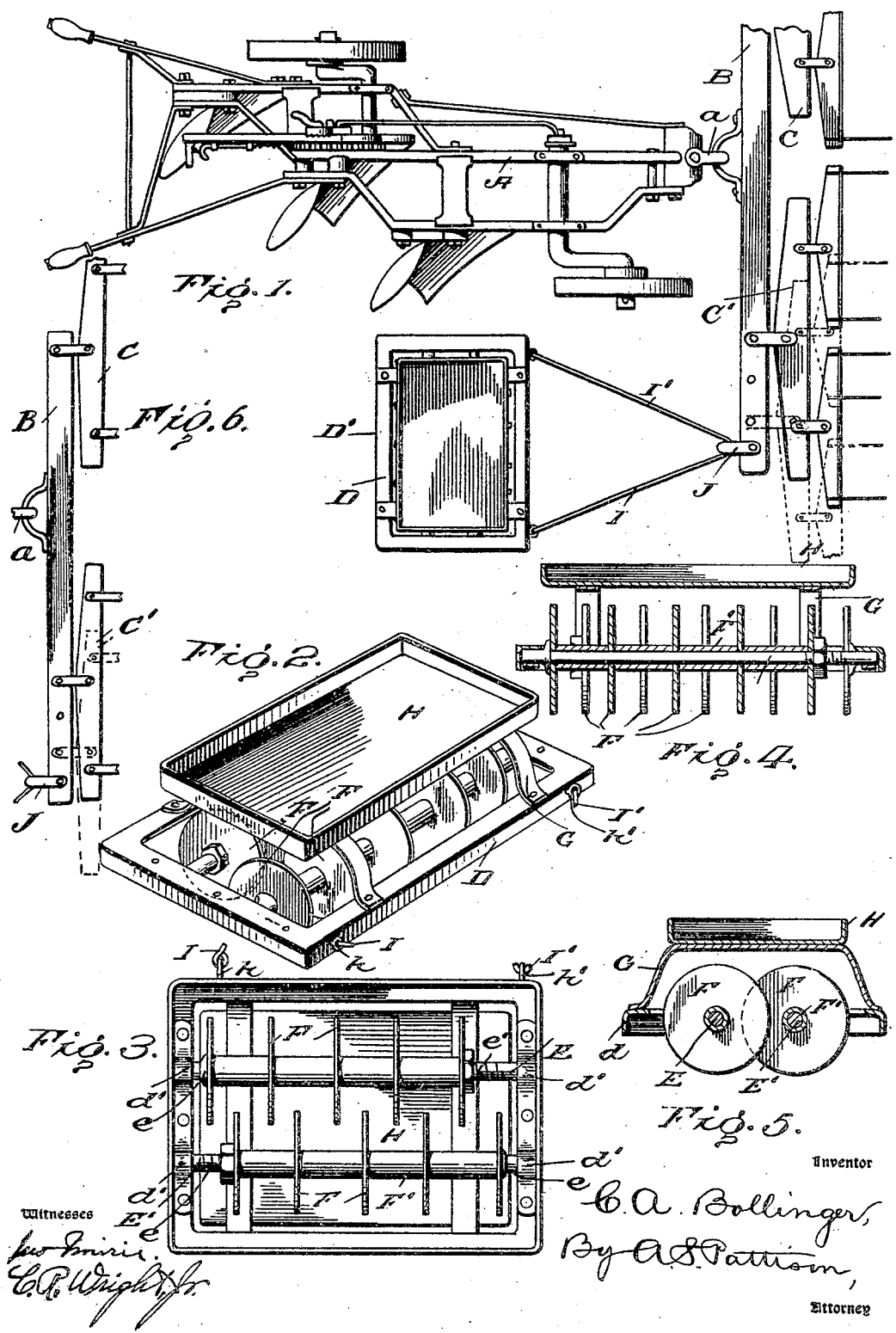

CHARLES A. BOLLINGER, OF BISBEE, NORTH DAKOTA.

COMBINED HARROW AND DRAFT ARRANGEMENT FOR PLOWS.

No. 800,974.        Specification of Letters Patent.        Patented Oct. 3, 1905.

Application filed September 15, 1904. Serial No. 224,558.

*To all whom it may concern:*

Be it known that I, CHARLES A. BOLLINGER, a citizen of the United States, residing at Bisbee, in the county of Towner and State of North Dakota, have invented certain new and useful Improvements in a Combined Harrow and Draft Arrangement for Plows, of which the following is a specification, reference being had therein to the accompanying drawings.

My invention relates to improvements in a combined harrow and draft arrangement for plows, and pertains more particularly to the class of wheel-plows, although the same might be used in connection with the ordinary plow.

The object of my invention is to provide an arrangement whereby the one operation of plowing also breaks and packs the furrow previously plowed, and the said harrow is so arranged upon the draft-beam that the harrow forms a draft-equalizer which allows of the even pulling of the horses on the draft-beam.

Another object of my invention is to provide a more simple, cheap, and effective harrow so arranged to accomplish the above results.

In the accompanying drawings, Figure 1 is a top plan view of my combined harrow and draft-equalizer, which is shown attached to the ordinary wheel-plow. Fig. 2 is an enlarged perspective view of the harrow. Fig. 3 is a bottom plan view of the harrow, showing the arrangement of the revolving shafts and the disks carried thereby. Fig. 4 is a longitudinal vertical sectional view, and Fig. 5 is a transverse vertical sectional view. Fig. 6 is a top plan view of the draft-beam, showing its connection with the plow-beam and the flexible harrow connection.

Referring now to the drawings, A represents the ordinary wheel-plow, which, as shown, has the outer end of the beam provided with a clevis $a$, which is preferably used on plows of this character. Connected to the said clevis in the usual manner is a draft-beam B, which, as shown, is connected to the clevis off of the center, or, in other words, the beam has a greater portion on the side the furrow is turned, the doubletrees C and C' being connected to the draft-beam B adjacent the ends of the beam, and thus the doubletree C' on the long end of the draft-beam has a greater leverage, and thus has a greater draft strength. To equalize this draft strength and place the same draft upon each horse or pair of horses, I attach the harrow D, which not only causes an even draft upon the horses, but also prevents any jerking which would occur if the harrow was attached to some portion of the plow and at the same time relieving the plow of any extra strain whatever. The said harrow D is formed of a rectangular frame D', which, as shown, is made of angular metal provided with the downwardly-extending flange $d$, which strengthens the same. Carried by the under side of said frame at each end are journal-boxes $d'$, in which are mounted two transverse shafts E and E', which carry the harrow-disks, which I will now proceed to describe. The said shafts adjacent one end are provided with stops $e$, and loosely surrounding the shafts and fitting against said stops are disks F, any number being used and being separated by sleeves F, and said disks are so arranged on their respective shafts that they do not come opposite each other, and the shafts are so spaced apart that the said disks intermesh, and thus cause the ground or clogs to be thoroughly broken. The ends of the shafts opposite the stops are screw-threaded at $e'$, and screwed upon the said shafts are nuts which are adapted to bear against the end disk and firmly lock the disks upon the shaft between the sleeves, so that the same cannot rotate.

The upper face of the frame D' is provided with upwardly-extending arms G, upon which is rigidly mounted a box-like receptacle H, which is supported sufficiently above the frame to allow of the disks being rotated with the shafts. The said receptacle is adapted to receive weights, such as stones or the like, and adapted to hold the harrow firmly down. The weight within said receptacle is adapted to be regulated according to the ground being worked.

The forward edge of the harrow is provided with eyes $h$ and $h'$, which have loosely connected thereto links I and I', which have their forward ends loosely connected to a ring J, which is secured to the end of the draft-beam by a loose connection of any description. By this structure it will be seen that the harrow is flexibly connected to the draft-beam and is adapted to ride the uneven ground without in any way affecting the draft-beam or the draft of the harrow. The attaching of the harrow in this position is such that the furrow previously plowed is thoroughly harrowed or packed, and thus during the operation a harrowing is also taking place, thus obviating the necessity of going over the ground with a harrow.

By the foregoing drawings and description it will be seen that the stubble as it is turned by the plow will be packed to the bottom of the furrow and the ground will be packed and leveled.

Having thus described my invention, what I claim, and desire to secure by Letters Patent, is—

1. An apparatus of the character described, comprising a plow, a draft-beam extending transverse thereof and secured adjacent one end to the plow-beam, the opposite end of said draft-beam having a series of openings therein, a harrow having a flexible connection with one of said openings in the draft-beam, a whiffletree permanently attached to the short end of said draft-beam and a whiffletree adjustably attached to the opposite end of said draft-beam within one of said openings, whereby the same series of openings allows of the adjustment of both the whiffletrees and the harrow.

2. The combination with a plow-beam, of a draft-beam extending transverse thereof and flexibly, yet permanently secured thereto adjacent one end, a draft arrangement secured to the short end of said beam, the opposite end of the draft-beam having a series of vertical openings therethrough, a harrow having a flexible connection with any of said series of openings in the long end of the draft-beam, and a draft arrangement adapted to be secured within any one of said series of openings, whereby the harrow and draft arrangement are independently adjusted.

In testimony whereof I affix my signature in presence of two witnesses.

CHARLES A. BOLLINGER.

Witnesses:
   GERTRUDE GEDDES,
   W. G. MILLER.